Oct. 23, 1951     H. W. COHEN ET AL     2,572,011
SHOEMAKING APPARATUS
Filed March 7, 1947     5 Sheets-Sheet 1
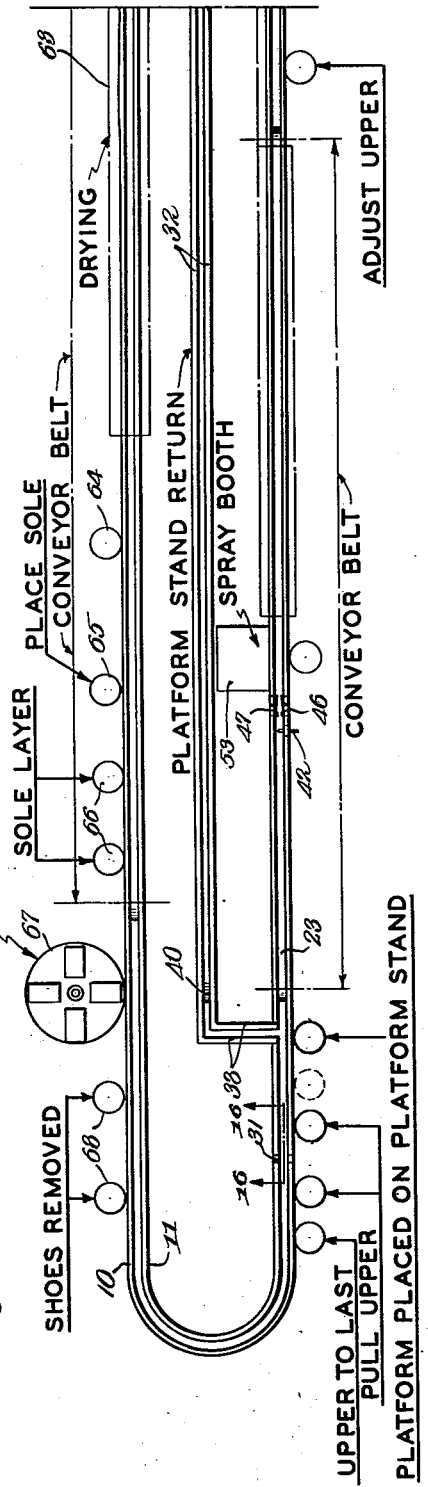
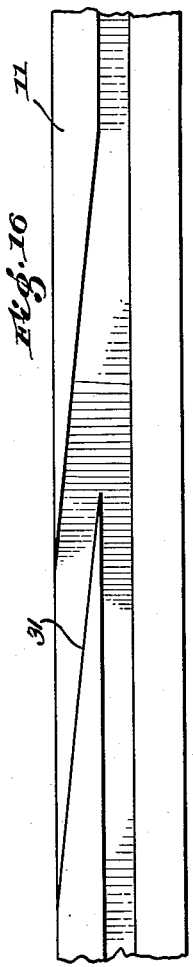
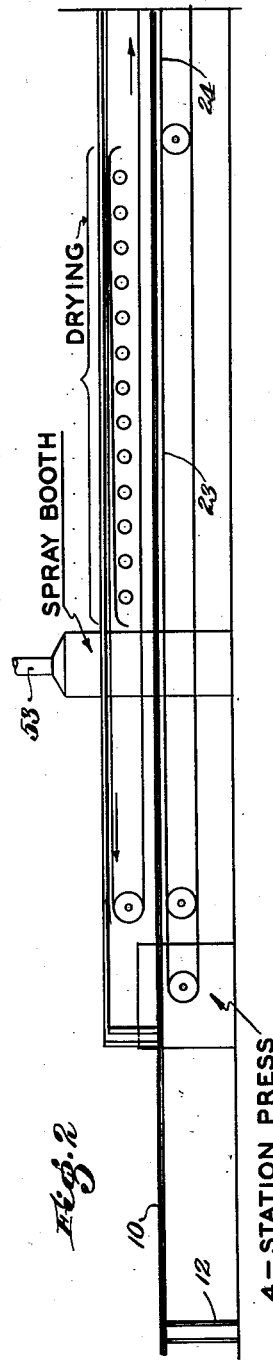

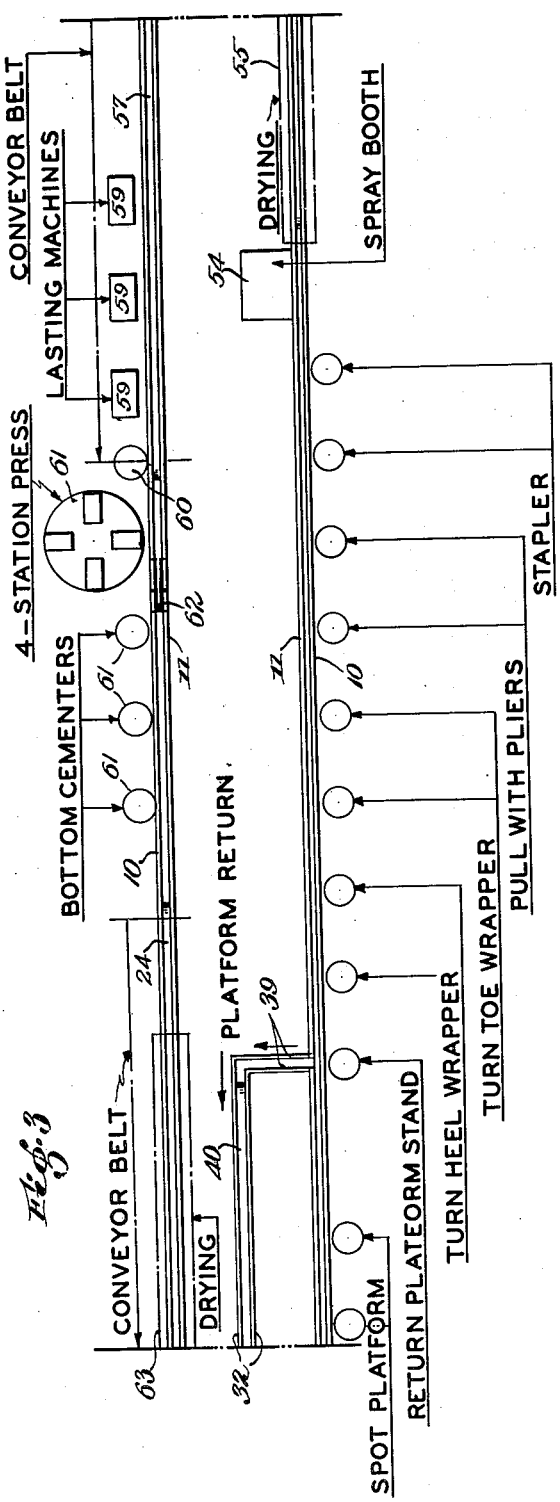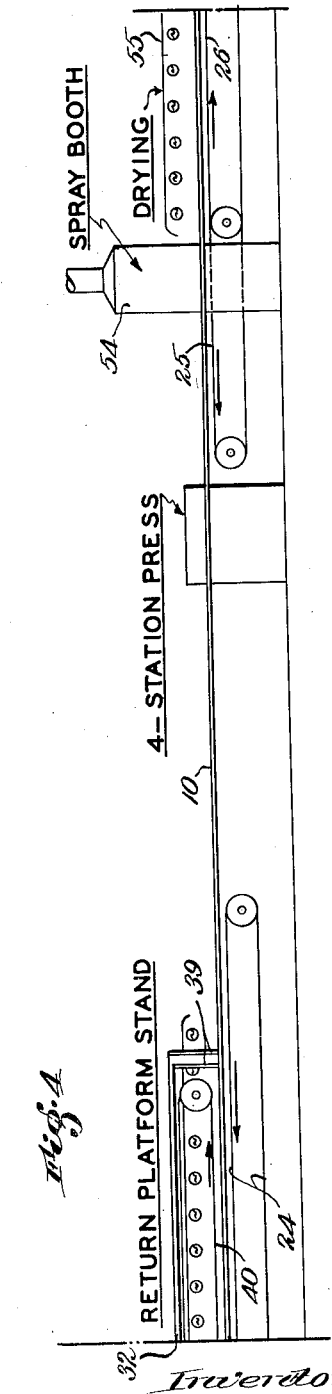

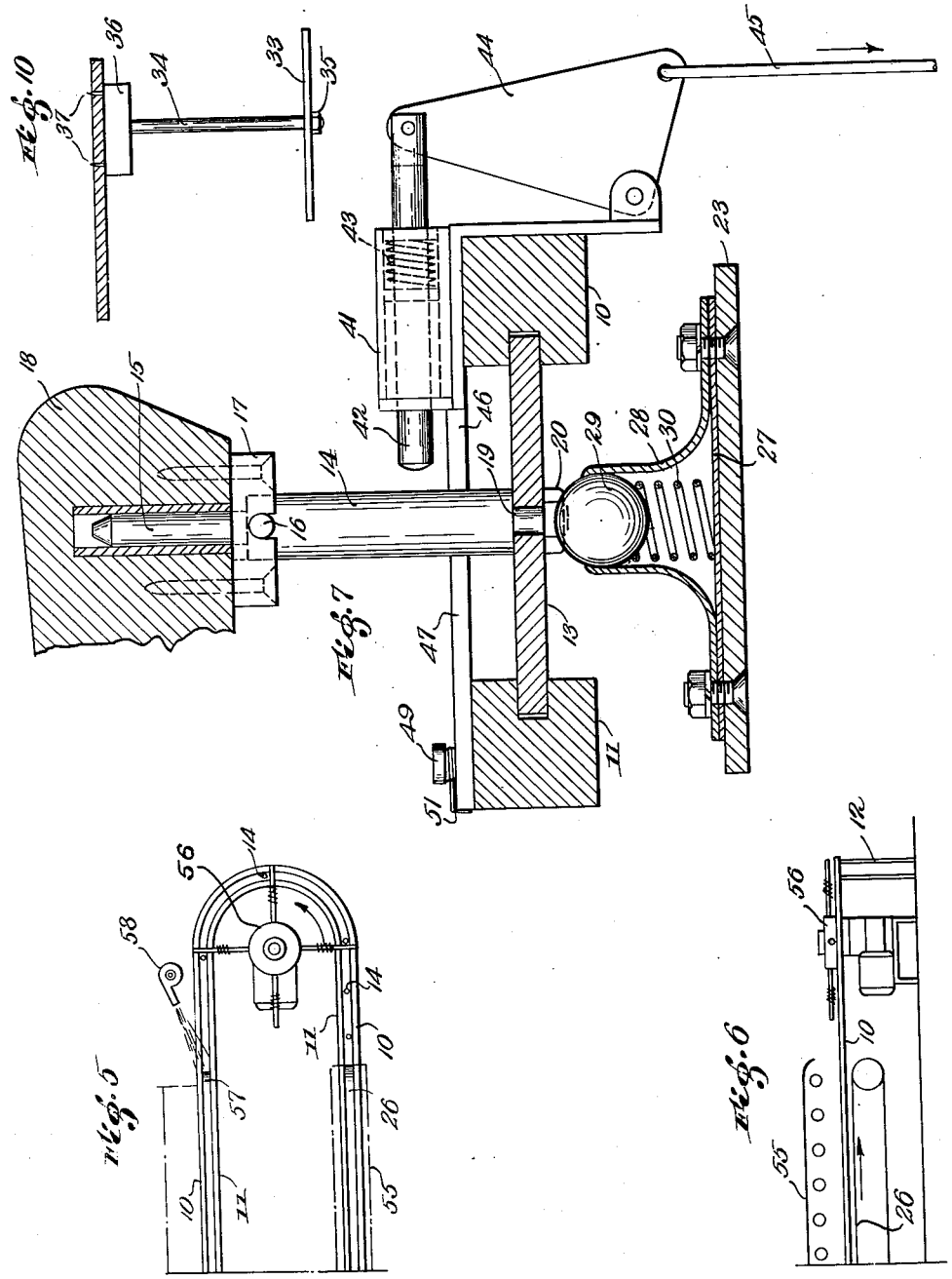

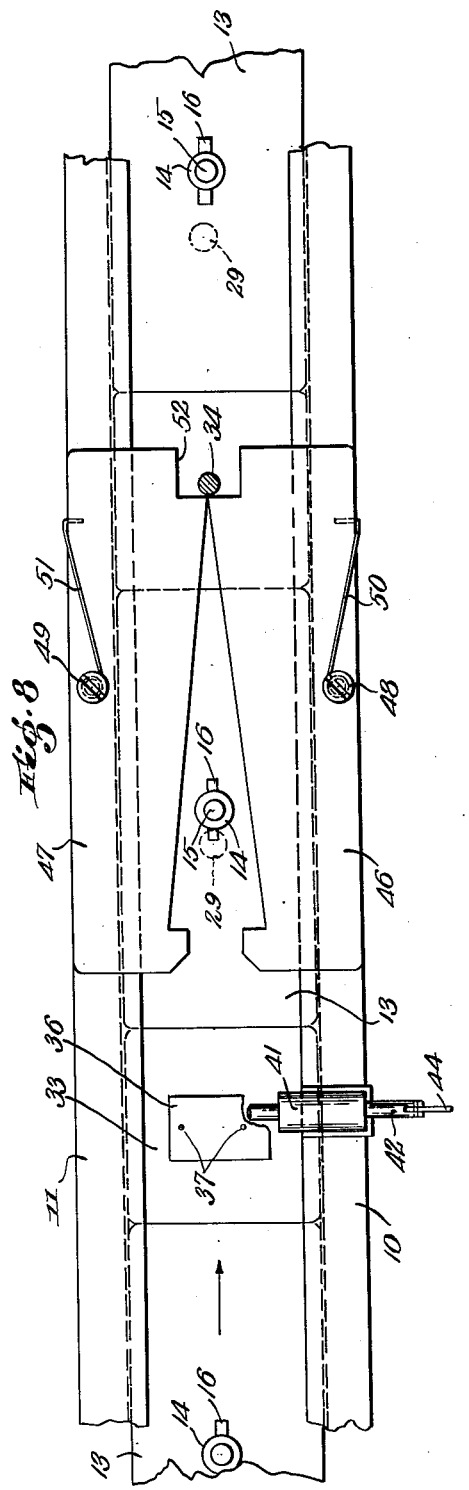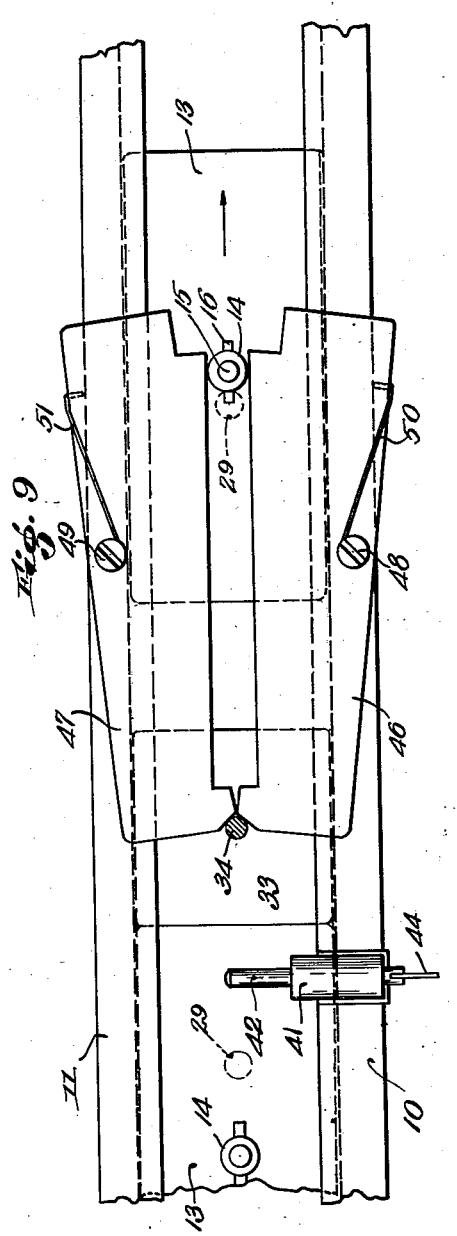

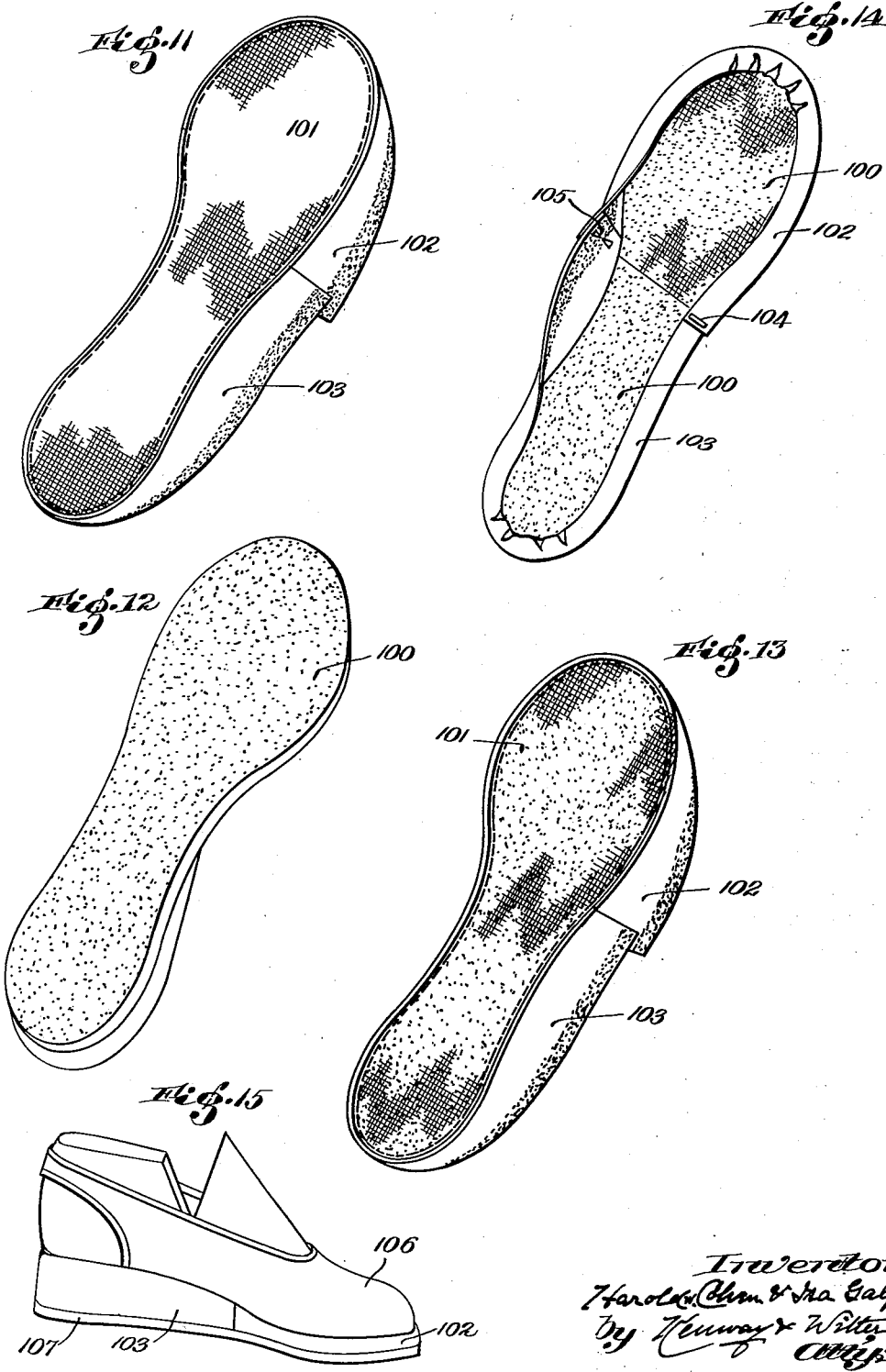

Patented Oct. 23, 1951

2,572,011

UNITED STATES PATENT OFFICE 2,572,011

SHOEMAKING APPARATUS

Harold W. Cohen and Isa Galper, Manchester, N. H., assignors to Bee Bee Shoe Co., Manchester, N. H., a corporation of New Hampshire Application March 7, 1947, Serial No. 733,084

22 Claims. (Cl. 91—18)

This invention consists in new and improved apparatus for manufacturing shoes by a continuous process in which the parts of the shoe are assembled and passed from one operator to another along a streamlined track.

While some attempts have been made in the past to provide the shoemaking industry with apparatus for the streamline manufacture of shoes, the fact remains that none has come into general use and that practically all shoes are manufactured with the assistance of racks designed to hold 36 pairs of shoes and pushed about the factory from one machine to another. The progress of all the shoes on the rack is therefore delayed while each shoe of the lot is taken from the rack, subjected to a machine or hand operation, and returned to the rack. For this reason the time during which the last must remain in the upper is made much longer than the time actually required for shoemaking purposes and the manufacturer is forced to the expense of an unnecessarily large number of lasts. For example, if the lasts of the operator are to remain for three days in his shoes, he must have three times as many lasts as his daily production of shoes. By employing the apparatus of our invention it is possible, for example, to reduce a requirement for 350 cases of lasts for a 160 case production to about 8 cases of lasts, and to make a reduction of as much as 40% in the man hours required for production over the requirements of conventional shoemaking. The employment of racks may be eliminated or they may be used only for storage purposes. Each operator is assigned a special operation of a simple and quickly performed character. The operators are lined up, each in a predetermined station, where his behavior is always under supervision. The shoes progressing through the apparatus are always visible and subject to convenient inspection. The factory space is cleared of racks which have hitherto at least partially hidden the operators from the foreman. Damage to shoes by tipping over the racks or dropping the shoes therefrom is obviated. Damage by daubing with cement is also reduced to a minimum.

With these ends in view an important feature of the invention consists in a series of carriers movable along a track and each adapted to present a partially completed shoe to successive operators, in combination with belt driving means acting continuously to urge the carriers by frictional contact along the track in which they are mounted while permitting them to remain at rest in any convenient position and for any interval that may be necessary for the operator.

In this connection other features of the invention relate to means for arresting and spacing the carriers in their movement along certain portions of the track as, for example, where it may be desired to bring a secondary series of carriers into the system in alternate arrangement with a series of last carriers.

In general, the flow of work is carried out mechanically, the shoe being presented to each operator and held stationary in a position advantageous for the operation which he has to perform upon it. The shoe parts are all scheduled and delivered so that no operator has to waste time in selecting from an assortment of sizes or shapes. Thus, in addition to a valuable saving of time, the possibility of mistakes is also eliminated or minimized.

The apparatus is so organized that it has great flexibility, permitting longer or shorter delay at any station without holding up the general flow of work through the entire system. Thus the novel apparatus compares favorably with systems in which a shoe carrier is permanently attached to a belt or where a shoe has to be removed from the spindle for each consecutive operation.

The apparatus includes a drying unit for cemented shoe parts designed to accommodate changes in humidity encountered in the ordinary operation of the apparatus. Preferably it includes a number of radiant heat lamps and its action may thus be regulated by changing the number of lamps in action, by raising or lowering the lamps as a unit, or by regulating the speed of the conveyor belt and the consequent movement of the carrier units beneath the lamps.

These and other features of the invention will be best understood and appreciated from the following description of a preferred embodiment thereof, selected for purposes of illustration and shown in the accompanying drawings in which:

Figs. 1, 3 and 5 together constitute a plan view of the apparatus,

Figs. 2, 4 and 6 together constitute a view in elevation,

Fig. 7 is a view in transverse section showing one of the last carriers and associated parts, Figs. 8 and 9 are plan views illustrating mechanism for spacing the last carriers, Fig. 10 is a view in elevation of the platform sole stand or carrier, Fig. 11 is a view in perspective of an upper as it comes initially to one of the carriers, Fig. 12 is a view in perspective of a platform sole, Figs. 13 and 14 are views in perspective of a shoe showing progressive stages in its manufacture, Fig. 15 is a perspective view of a finished shoe, and Fig. 16 is a fragmentary view on an enlarged scale of a portion of the track.

The track as herein shown may comprise inner and outer rails 10 and 11 supported by legs 12 at a height convenient for the operators and disposed in the form of a long narrow closed loop which may be, for example, approximately 120 feet long and 6½ feet in width. The rails 10 and 11 are provided with opposed parallel grooves, as best shown in Fig. 7, in which is movably contained a series of rectangular plates 13 each constituting the base of a last carrier. The plates thus interfit with the rails for sliding movement along the track. Each last carrier has a vertical spindle 14 provided at its upper end with an upstanding last pin 15 and a transverse locating pin 16. The pin 16 cooperates with a transversely grooved last plate 17 secured to the cone of the last in determining and fixing the angular position of the last upon the spindle. The spindle 14 is shouldered at its lower end to form a stem 19 that is passed through the base plate 13 and is threaded to receive a hexagonal nut 20 by which the parts of the last carrier are firmly and permanently secured together and a contact element is provided by which the plates may be fed along the track. The contour of the plates 13 is best shown in Figs. 8 and 9 from which it will be apparent that their dimensions are such as to maintain each of the spindles supported firmly in upright position.

Running beneath the track 10—11 is a conveyor or propeller belt 23 supported by suitable rolls and guide rolls, not shown, and provided with a series of frictionally acting driving devices as best shown in Fig. 7. Other conveyor belts 24, 25 and 26 are similarly disposed beneath other sections of the track. The various conveyor belts are provided with frictional driving devices. As shown in Fig. 7, each of these comprises a base plate 27 and a conical tubular cap 28 containing at its upper end a ball 29 which is supported in a yielding manner upon a spring 30 contained within the cap and resting upon the base plate 27. The spring 30 maintains the ball 29 normally in a protruding position where it extends above the end of the cap 28 and acts as a yielding pusher in position to engage the nut 20 under each carrier base plate 13. The base plate 27 and the cap 28 are secured to the conveyor belt 23 by suitable short bolts and successive plates 27 are spaced from each other by a distance slightly greater than the spacing of the spindles 14 in successive carriers.

It will be understood that in the normal and continuous operation of the apparatus a ball 29 will engage a nut 20 of each last carrier and as the conveyor belt is advanced, the last carrier will be moved ahead by engagement with the ball 29. If, however, forward movement of the last carrier is interrupted for any reason, the ball 29 will yield downwardly against the compression of the spring 30 and pass beneath the nut 20 allowing the carrier to remain temporarily undisturbed. In all positions the base plates of the carriers are held at their opposite edges by the grooves of the rails 10 and 11 at a predetermined level and are thus prevented from being lifted despite contact of the balls 29.

We have found it important to space the driving devices differently from the spacing of the spindles 14 of the last carriers when the latter occupy contiguous positions because if the spacing of these two sets of elements were equal, it would require the depression of all the balls 29 at the same time in case a line of last carriers was arrested in its movement and thus a considerable intermittent load would be thrown on the conveyor belt 23. By spacing the elements differently as above suggested, the balls 29 are depressed without regular rhythm and the load on the conveyor belt thus distributed.

The shoemaking operation begins at the left hand end of the track as shown in Figs. 1 and 2. At some convenient point in this vicinity the track is provided with an oblique switch section 31 by which carriers may be introduced into or removed from the track or replaced in case of damage. At the first station a carrier presents a last, disposed transversely of the track with its heel outermost, to the operator who at that station slips on the last the partially formed upper consisting, for example, of a sock lining with the upper stitched thereto. As soon as this upper has been loosely placed on the last by the first operator, he pushes the carrier to the second operator who pulls rearwardly on the toe portion, fitting that part of the upper to the last. He, in turn, advances the carrier to the third operator who pulls down the heel portion of the upper, using a horn if necessary in the operation. Having conformed the entire upper to the last, the carrier is advanced to a fourth operator in case any supplementary operation such as buckling a strap is necessary at this stage of manufacture.

The carrier is next advanced, again by hand, to an operator who is located at the station marked "Platform Placed on Platform Stand" in Fig. 1. At this point it will be convenient to describe the auxiliary or loop track 32 by which a series of special platform stands is brought into line with the last carriers already described. The platform stand itself comprises a base plate 33 which is square in contour and fits freely into the grooves formed in the rails 10 and 11. The base plate 13 of each last carrier may be 3 x 6 inches in dimensions, whereas the base plate 33 of the platform stand may be 3 x 3 inches. The platform stand includes an upright spindle 34 shouldered and secured to the base plate 33 by a nut 35 corresponding to the nut 20 of the last carriers. At the upper end of the spindle is provided a horizontal plate 36 having a pair of upstanding spurs 37. The platform sole piece is held temporarily on the plate 36 by being pressed upon the spurs 37.

The switch track 32 is located at a higher level than the main track and is connected to the main track by short forwardly and downwardly inclined track sections 38 and 39. It is equipped with a conveyor or propeller belt 40 which advances the platform stands from right to left, as seen in Figs. 1 and 3, in a manner similar to that in which the last carriers alternating with the platform stands are advanced by the belt 23 from left to right along the main track but in the opposite direction. As already stated, the operator standing opposite the transverse track section 38 passes first a last carrier and then a platform stand toward the right into the path of the conveyor belt 23 and in this operation places a platform sole in inverted position upon the plate 36 of each platform stand. From there on the alternately disposed carriers and stands are controlled by a treadle-operated stop or latch. This, as shown in Fig. 7, comprises a casing 41 containing a horizontally moving bolt 42 normally pressed forwardly or inwardly by a compression spring 43 and connected at its outer end to a triangular link 44 pivotally mounted upon a bracket secured to the rail 10 and arranged to be retracted through treadle connections 45. When the treadle is released, the bolt 42 stands in the path of the spindles 14 and 34 and acts to arrest forward movement of the carriers and platform stands. In the normal operation of the apparatus the bolt 42 is held retracted so that the carriers and stands advance without obstruction at this point in their path.

Just beyond the bolt 42 is located spacing or escapement mechanism comprising a pair of plates 46—47 pivotally mounted on studs 48 and 49 set respectively in the rails 10 and 11 and provided with springs 50 and 51 which tend to rock the plates inwardly at their right hand ends as shown in Figs. 8 and 9. The plates jointly form a square notch 52 at their forward ends and their inner edges diverge symmetrically and rearwardly. Both plates are shouldered at their left hand ends and beveled to provide an opening through which the spindles 14 or 34 may pass with clearance.

From an inspection of Figs. 8 and 9 it will be seen that as a spindle 14 passes into an opening between the plates 46 and 47, it gradually encounters the diverging edges of these plates and tends to force them apart as shown in Fig. 9. At the same time the rear ends of the two plates are swung together so that they form a positive stop for the next approaching spindle. That spindle together with its carrier is therefore arrested and held at rest until the advancing spindle 14 passes out from between the forward ends of the plates into the notch 52. When this occurs, the springs 50 and 51 immediately swing the right hand ends of the plates together, allow the closed ends of the plates to separate and thus release the spindle for further advancing movement.

Next beyond the spacing mechanism is located a spray booth, and due to the action of the spacing mechanism the carriers and stands are released for movement to and past the booth in separated or spaced condition. As they pass, the shoe bottom and the surface of the platform sole are coated with cement by an operator equipped with a spray gun. The separation of the areas to be cemented facilitates this operation and if desired a mask may be employed to protect the areas which should be kept free of cement. The spray booth is provided with an exhaust connection 53 by which fumes incident to the cement are removed and the cementing operation made cleanly and healthful for the operator.

Next to the spray booth is provided an elongated drying station comprising a plurality of infra-red electric lamps. These are conventionally represented in Fig. 2 and may comprise as many as nine banks of lamps of six lamps each, arranged to be raised or lowered or to be cut out of the operating circuit in varying numbers so as to control the heat to which the cemented surfaces are subjected in accordance with variation in humidity from day to day. The cement employed may be rubber latex dispersed in water or pyroxylin cement diluted by a solvent. The cemented surfaces must be partially dried before being brought into contact and this is accomplished by moving them slowly along the track beneath the infra-red lamps of the station marked "Drying."

As the carriers pass beyond the drying station they are inspected by an operator who adjusts the upper at the station marked "Adjust Upper." The shoes then pass to two operators at the station marked "Spot Platform." One of these operators takes the right platform sole from its stand and spots or accurately locates it upon the cemented sock lining. The left shoe and platform passes to the second of these operators who performs the second operation. The platform stands are now empty but continue to advance between adjacent carriers to the operator located opposite the inclined auxiliary track 39 at the station marked "Return Platform Stand." The duty of this operator is to push the platform stands into the auxiliary track. As already explained, these are square in contour so that they may move freely at right angles to the direction of the main track. They are pushed one by one into the transverse track 39 and progressively reach the longitudinal auxiliary track 32 by which they are returned toward the left to the point at which they are again to be used. Fig. 11 indicates the character of the coated platform sole 100, and Fig. 10 the appearance of the partially completed upper and sock lining 101 as they are presented by a stand and a carrier, respectively, to the operators at the "Spot Platform" station. At this stage the forepart binding strip 102 and the rearpart binding strip 103 have been stitched in inside-out condition to the sock lining 101 and extend downwardly and away from the platform sole.

The next operation on the shoe is performed by the operator at the station marked "Turn Heel Wrapper." He grasps the rearpart binding strip 103 and turns up upwardly about the margin of the platform sole 100. Preferably two operators take care of this operation, one working on the right shoe and the other on the left shoe.

The shoe now passes to an operator located at the station marked "Turn Toe Wrapper" who similarly turns the forepart binding strip 102 upwardly about the toe portion of the platform sole, and here again it is usually desirable to employ two operators, one for the right and one for the left shoe.

Beyond these operators are located two operators at station marked "Pull with Pliers" whose duty is to pull up the binding strip smoothly so that it shall conform to the marginal edge of the platform sole without wrinkling. The shoe then passes to operators located at the station marked "Stapler" at which staples 104 and 105 are inserted to form a permanent connection between the two parts 102 and 103 of the binding strip. The shoe now passes before a second spray booth 54 where the upper face of the platform sole is sprayed by a hand sprayer in a marginal zone inside the binding strip which now projects upwardly. On leaving the spray booth 54 the shoes are advanced to a second drying station 55 where the cement just applied is dried preparatory to having the binding strip folded upon it. Upon leaving the drying station 55 the carrier passes beyond the belt conveyor 26 and comes into range of a feeder wheel 56 having spokes which engage the spindles 14 of the carriers one after another and advance the carriers about the semi-circular end of the track and to its return side where it is picked up by another conveyor belt 57 and advanced from right to left. Each spoke of the feeder wheel 56 has a spring section as indicated in Fig. 5 so that if the carriers are blocked for any reason in their movement, the spokes may yield and pass by the spindles. It will be understood that the conveyor belt 26 does not advance the carriers directly into the path of the feeder wheel 56 but acts to push one or two carriers along the main track until engaged by one of the spokes. Similarly, one or two carriers may be disposed in the track between the last carrier engaged by the feed wheel and the first carrier engaged by the conveyor belt 57 on the return side of the track.

The partially completed shoes reaching the feeder wheel 56 have been thoroughly warmed by their passage through the two drying stations in the main track and it is desirable to cool the work before subjecting it to further operations. Accordingly, a blower 58, or a series of blowers, are arranged to direct blasts of cold air on the shoes as they pass along the main track under the actuation of the conveyor belt 57. In some cases it has been found advantageous to pass the cooling air over dry ice before it reaches the work, or through a refrigerating unit.

The partially formeed shoes are now advanced to a station marked "Lasting Machines." At this point three operators take successive shoes from their spindles and present them to cover-lasting machines which draw the binding strips 102 and 103 upwardly and fold them over upon the cemented bottom of the platform sole 100, thus bringing the shoe bottom to the condition shown in Fig. 13. The marginal edges of the binding strips are pressed down smoothly upon the surface of the platform sole and bonded by cement securely thereto. As shown in Fig. 3, these cover lasting machines are indicated by reference character 59.

Upon leaving the cover lasting machines it is in some cases advisable to place a filler on the shoe bottom to level the area between the wrapped flanges of the binding strips. This may be effected by placing a paper or fibre filler on the cemented area of the platform and may be carried out by an operator located at the station 60 in Fig. 3.

The shoes then pass to a bottom pressing station marked "4-Station Press" 61. Here the bottom of each shoe is subjected to severe pressure while the press makes four intermittent rotary steps. This operation makes a better bond between the wrapper and the platform, flattens the bottom of the shoe preparatory to receiving the outsole, and squares the edge of the platform sole that may have been distorted in the cover lasting operation.

Each shoe on its last is removed from its spindle as it reaches the sole pressing station and passes through the machine under pressure. Upon delivery from the press it is returned to its spindle, and in some cases it has been found desirable at that time to mark on the bottom of the shoe the size of the platform sole which it carries.

The shoes are next advanced to three bottom cementers located at stations 61, being spaced at this point by an escapement mechanism 62 similar to the mechanism 46—47 already described. At these stations a thick layer of cement is applied to the exposed surface of the platform sole and to the inturned margins of the binding strips. The cement at these stations may be applied by hand brushes or in any other convenient manner.

The carriers now advance with cemented surfaces to a drying station 63 which in practice may comprise 12 to 14 banks of lamps similar to those already described. These are not shown in detail but their location is indicated in Figs. 1 and 3 and marked "Drying." They extend for substantial distance along the main track and the carriers are advanced beneath them by the action of a conveyor belt. Upon leaving the drier the shoes pass before an operator at station 64 whose duty it is to inspect the bottom and to press down any portions of the wrapper which have not been adhesively secured in flat condition. The carriers are then advanced to an operator at station 65 designated "Place Sole" at which station an outsole of the proper size is placed loosely on the bottom of each shoe. The carriers now arrive at the sole laying stations 66 where two operators adjust and place the soles accurately on the cemented bottom of the shoes and cause them to adhere preliminarily. As the carriers leave the sole laying station they pass beyond the end of the conveyor belt which has advanced them up to this point and arrive at a second 4-station sole press 67. Here the shoes are again removed from their spindles and placed in the press. They are advanced intermittently while held under pressure and the outsole permanently bonded into the shoe bottom.

Upon leaving the sole press 67, each shoe is placed on the spindle of its carrier and advanced to two operators at station 68 where the lasts are pulled, or rather the complete shoe is removed from the last which then remains on its spindle. At this point the shoes leave the track and are placed on a rack in which they are moved to a heel attaching machine, not shown in the accompanying drawings. Here the heels are attached, subsequently heel pads are inserted, lacings or ornaments supplied, the shoes cleaned and brushed, advanced to final inspection and packing.

The last carriers are now pushed about the semi-circular end of the main track in readiness for recirculation in a repetition of the sequence of operations above described. It will be noted that the forwardly inclined switch track section 38 tends to advance by gravity the sole or platform carrier toward the main track.

It will be understood that the apparatus of our invention is in no sense limited to production of shoes of the specific type shown in Figs. 11–15; but that it is well adapted to advance partially formed shoes or shoe parts from station to station and to present them in convenient position and condition for any shoemaking operation required or desired by the manufacturer.

Having thus disclosed our invention and described in detail one illustrative embodiment thereof, we claim as new and desire to secure by Letters Patent:

1. Apparatus for making shoes by continuous process, comprising a main track, last carriers each provided with an upstanding last spindle and being movable along the track, an auxiliary track supplementing a limited extent of the main track and opening at all times into the main track, and a series of sole carriers each provided with a flat sole supporting face and being movable intermittently about said auxiliary track and alternating in the main track with said last carriers, both the last carriers and the sole carriers engaging and being movable in the main track, and the last carriers being too long to enter the auxiliary track by widthwise movement.

2. Apparatus for making shoes by continuous process, comprising a main track, a serits of last carriers movable along said track, an auxiliary loop track leading to and from the main track at spaced points respectively, means for spacing the last carriers on the main track preparatory to spraying shoe parts thereon, a series of sole carriers movable successively by the operator from the loop track into alternate arrangement with respect to the last carriers spaced on the main track, and a spray booth in which shoe parts are presented for cementing by both series of carriers while on the main track, the sole carriers being thereafter returned to the receiving end of the loop track.

3. Apparatus for making shoes by continuous process, comprising a main track, a series of last carriers having rectangular plates engaged with and movable freely along the main track, a loop track leading from and into the main track, and a series of sole carriers having square plates engaged with and movable freely along the main track and movable at right angles out of the main track and into the loop track.

4. Apparatus for the manufacture of shoes, including an elongated track having opposed rails supported in convenient height from the floor, a series of last carriers engaged with and freely movable along the rails of the track, being confined thereby against upward displacement and each having an upright last spindle, and a propeller belt running beneath the track in position to advance the carriers along the track by frictional engagement therewith.

5. Apparatus for the manufacture of shoes, including an elongated horizontal track having opposed rails, a series of carrier members for shoe parts freely movable along the rails of the track and each having a flat base inter-fitting with the track, an upright supporting spindle and a downwardly projecting contact member, a propeller belt running beneath the track, and a series of pushers mounted on the belt and including a spring pressed ball movable into engagement with the contact members of said carrier members.

6. Apparatus for making shoes by continuous process, comprising a fixed rail providing a horizontal track, a series of carriers for shoe parts engaged with and guided upon the track for longitudinal movement, a propeller belt running beneath the track, frictionally acting contact devices carried by the belt, and a movable device located near the track and under control of the operator for positively interrupting movement of said carriers.

7. Apparatus for making shoes by continuous process, comprising a fixed rail providing a horizontal track, a series of carriers for shoe parts engaged with and guided for longitudinal movement upon the track, a propeller belt running adjacent to the track and arranged to advance the carriers substantially in contact with each other and by frictional contact, and a pivoted plate actuated by the carriers for intermittently arresting the movement of each carrier and then releasing it after an interval measured by the movement of the preceding carrier.

8. Apparatus for making shoes by continuous process, comprising a horizontally disposed stationary track having opposed longitudinal slots therein, a series of last carriers having rectangular bases movable in said slots, a series of sole carriers having bases of different dimensions also movable in said slots, and a belt associated with the track and having yielding means acting continuously and frictionally to advance both series of carriers along the track the last carriers being relatively long and thus affording substantial working space about lasted shoes thereon while the sole carriers are relatively short and so economize space in the track.

9. Apparatus for making shoes by continuous process, comprising a main track supported at a predetermined level, last carriers engaged with and movable along said track, a loop track disposed in part at a higher level than the main track and communicating at all times therewith at spaced points through the medium of inclined branches, and sole carriers engaged with and movable both along the main track in alternation with the last carriers and in contact with each other along said loop track.

10. Apparatus for making shoes by continuous process, comprising a track, last carriers movable along the track and each including a spindle for holding a last in predetermined position thereon, a belt for frictionally advancing said carriers, a spray booth adjacent to the track, and escapement mechanism for spacing apart the individual carriers on the track before they arrive at the spray booth.

11. Apparatus for making shoes by continuous process, comprising a track, a series of last carriers movable along the track, a belt associated with the track for frictionally advancing the carriers, escapement mechanism for temporarily arresting successive carriers as advanced by the belt and releasing them in spaced relation, a spray booth adjacent to the track before which the said carriers are advanced in spaced relation, and a bank of drying lamps disposed above the track beyond the spray booth.

12. Apparatus for making shoes by continuous process, comprising fixed horizontally disposed rails having opposed guide slots and providing an endless, loop-shaped track having end sections of semi-circular contour, a series of last carriers each comprising a rectangular base having an upstanding last spindle and being movable along the track the said bases having a sliding fit with the track, a wheel at one end of the track, rotatable about a vertical axis and having radial spokes located in position to engage successive last spindles for advancing the carriers about the end of the track, and a belt disposed beneath a side portion of the track having yielding means for advancing the carriers in a straight line path.

13. Apparatus for making shoes by continuous process, comprising an endless track, a series of carriers each provided with a spindle for holding a lasted shoe with its bottom uppermost and being movable along the track in sliding engagement therewith, a spray booth, drying lamps and a cold air blower located adjacent to the track to function successively upon partially completed shoes presented by the carriers in their movement along the track.

14. Apparatus for making shoes by continuous process, comprising an endless track having opposed horizontal guide slots, a series of last carriers each including a base plate freely slidable at its opposite edges in the slots of the said track, and mechanical means for advancing the carriers along the track, the track having at one point in its length slots leading from the said horizontal slots and inclined with respect thereto, whereby selected carriers may be removed from circulation.

15. Apparatus for the manufacture of shoes, comprising fixed spaced rails providing a horizontal track, a series of abutting carriers corresponding in width to the width of the track and being movable along the track and each having a projecting contact member, a belt driven in a path adjacent to the track, and a series of yielding pushers mounted on the belt and spaced apart by distances which are different from a multiple of the distance between the contact members of consecutive carriers.

16. Shoemaking apparatus comprising an elongated track supported above the floor, a series of carriers engaged with and movable along the track in substantial contact with each other and each provided with an upright last spindle holding a lasted shoe in position transverse of the track, and a driven belt carried by the track and having yielding means operating to advance the individual carriers by frictional contacts while permitting any of them to stand at rest upon the track when its free passage is obstructed, and a movable stop under manual control for positively arresting any selected carrier at a predetermined point on the track.

17. Shoemaking apparatus comprising an elongated track having opposed horizontal grooves therein, a series of carriers having rectangular bases sliding with their opposite edges in said grooves and having upstanding last spindles, and a propeller belt driven in a path beneath the carriers in the track and having spaced yielding contact members acting to engage and advance the carriers from time to time while the latter are maintained at a predetermined level by the said track.

18. Shoemaking apparatus comprising a main track and a loop track opening into the main track at spaced points and both tracks having opposed grooves spaced equally and uniformly throughout their length; a series of last carriers having rectangular bases fitting the grooves of the main track for longitudinal movement therein and being longer than the width of the loop track whereby they are prevented from passing transversely into it; and a series of sole carriers having square bases fitting both the grooves of the main track and those of the loop track.

19. Shoemaking apparatus comprising a grooved track extending horizontally in a fixed position, a series of spindle-carrying plates movable along the grooves of the track, a propeller belt for yieldingly advancing the plates substantially in contact with each other, and escapement members pivotally mounted to yield outwardly on opposite sides of the track and having beveled faces meeting in the path of the spindles whereby they may be forced into arresting position by the passage of successive spindles.

20. Apparatus for making shoes by continuous process, comprising inner and outer endless tracks of the same effective width, the inner track being disposed in part within the outline of the outer track, supplementing it in part and leading into it at both ends at right angles; in combination with two series of rectangular carriers for shoe parts, the carriers of both series being equal in width and the carriers in the outer track being longer than those on the inner track whereby they are prevented from entering the inner track by movement at right angles to the outer track.

21. Shoe making apparatus comprising a track having parallel side rails with opposed grooves, a shoe carrier comprising a rectangular plate slidably fitting in said grooves and held at a predetermined level thereby, a contact member fast to the underside of the plate, a propeller belt movable in a path parallel to the track and below the same, a series of contact members carried by the belt and yieldingly supported in position to engage the contact member of the plate, and spring means resisting depression of said contact members.

22. Shoemaking apparatus as defined in claim 21 in which a last spindle projects upwardly from each carrier plate, and the contact member fast to the underside of the plate is located in alignment with and below the spindle, and serves to secure it to the plate.

HAROLD W. COHEN.
ISA GALPER.

REFERENCES CITED

The following references are of record in the file of this patent:

UNITED STATES PATENTS

| Number | Name | Date |
|---|---|---|
| 896,677 | Zickerman | Aug. 18, 1908 |
| 912,005 | Lehman et al. | Feb. 9, 1909 |
| 994,124 | Colahan | June 6, 1911 |
| 1,072,181 | Schuyler | Sept. 2, 1913 |
| 1,124,858 | Caruso | Jan. 12, 1915 |
| 1,580,957 | Chaffee et al. | Apr. 13, 1926 |
| 1,584,031 | Hannauer et al. | May 11, 1926 |
| 1,594,688 | Perry | Aug. 3, 1926 |
| 1,737,719 | Hipperson et al. | Dec. 3, 1929 |
| 1,792,322 | Richardson et al. | Feb. 10, 1931 |
| 1,842,411 | Ladd | Jan. 26, 1932 |
| 1,865,788 | Raymond | July 5, 1932 |
| 1,917,836 | Haddlesay | July 11, 1933 |
| 1,921,109 | Webb et al. | Aug. 8, 1933 |
| 2,041,765 | Howell | May 26, 1936 |
| 2,114,486 | Gialdini | Apr. 19, 1938 |
| 2,161,388 | Rosenthal | June 6, 1939 |
| 2,201,013 | Rosenthal | May 14, 1940 |
| 2,234,620 | Botley | Mar. 11, 1941 |
| 2,259,935 | Johnson | Oct. 21, 1941 |
| 2,277,710 | Mertzanoff | Mar. 31, 1942 |
| 2,288,585 | Partee et al. | June 30, 1942 |
| 2,344,155 | McBride et al. | Mar. 14, 1944 |
| 2,361,882 | Smith | Oct. 31, 1944 |
| 2,375,113 | Klammt et al. | May 1, 1945 |
| 2,460,782 | Gialdini | Feb. 1, 1949 |

FOREIGN PATENTS

| Number | Country | Date |
|---|---|---|
| 314,688 | Great Britain | July 4, 1929 |